United States Patent [19]

Bidiville et al.

[11] Patent Number: 5,680,157

[45] Date of Patent: Oct. 21, 1997

[54] POINTING DEVICE WITH DIFFERENTIAL OPTOMECHANICAL SENSING

[75] Inventors: Marc Bidiville; Javier Arreguit, both of Pully; Eric Vittoz, Cernier, all of Switzerland

[73] Assignee: Logitech, Inc., Fremont, Calif.

[21] Appl. No.: 927,334

[22] Filed: Aug. 10, 1992

[51] Int. Cl.[6] .................................................. G09G 1/00
[52] U.S. Cl. .................................... 345/165; 345/163
[58] Field of Search .............................. 340/709, 710; 345/156, 157, 158, 162, 163, 164, 165, 166, 167

[56] References Cited

U.S. PATENT DOCUMENTS

| | | |
|---|---|---|
| 4,404,865 | 9/1983 | Kim ................................... 340/710 |
| 4,712,100 | 12/1987 | Tsunekuni et al. ............... 340/710 |
| 4,767,923 | 8/1988 | Yuasa ................................ 340/710 |
| 5,027,109 | 6/1991 | Donovan et al. ................. 340/710 |
| 5,142,655 | 8/1992 | Drumm ............................. 340/709 |
| 5,160,918 | 11/1992 | Saposnik et al. ................ 340/709 |

*Primary Examiner*—Amelia Au
*Attorney, Agent, or Firm*—James E. Eakin

[57] ABSTRACT

A pointing device including a ball engaging one or more shaft encoders, each shaft encoder having an encoding wheel, including a monolithic photosensitive array for detecting light pulses representative of rotary movement of the ball. The photosensitive array provides a plurality of resolutions and permits accurate tracking of rotary movement of the ball without need for a mask. Comparator and latch means operate on the output of the array and provides digital hysteresis.

2 Claims, 7 Drawing Sheets

POINTING DEVICE WITH DIFFERENTIAL OPTOMECHANICAL SENSING

FIELD OF THE INVENTION

The present invention relates to pointing devices for cursors on video display screens for personal computers and workstations, and more particularly relates to optomechanical sensors for translating rotation of a ball into digital signals representative of such movement.

BACKGROUND OF THE INVENTION

Pointing devices, such as mice and trackballs, are well known peripherals for personal computers and workstations. Such pointing devices allow rapid relocation of the cursor on a display screen, and are useful in many text, database and graphical programs. Perhaps the most common form of pointing device is the electronic mouse.

With a mouse, the user controls the cursor by moving the mouse over a reference surface; the cursor moves a direction and distance proportional to the movement of the mouse. Although some electronic mice use reflectance of light over a reference pad, most mice use a ball which is on the underside of the mouse and rolls over the reference surface (such as a desktop) when the mouse is moved. In such a device, the ball contacts a pair of shaft encoders and the rotation of the ball rotates the shaft encoders, which includes a mask having a plurality of slits therein. A light source, often an LED, is positioned on one side of the mask, while a photosensor, such as a phototransistor, is positioned substantially opposite the light source. Rotation of the mask therebetween causes a series of light pulses to be received by the photosensor, by which the rotational movement of the ball can be converted to a digital representation useable to move the cursor.

In conventional electronic mice, a quadrature signal representative of the movement of the mouse is generated by the use of two pairs of LED's and photodetectors. However, the quality of the quadrature signal has often varied with the matching of the sensitivity of the photosensor to the light output of the LED. In many instances, this has required the expensive process of matching LED's and photodetectors prior to assembly. In addition, varying light outputs from the LED can create poor focus of light onto the sensor, and extreme sensitivity of photosensor output to the distance between the LED, the encoding wheel, and the photosensor.

There has therefore been a need for a photosensor which does not require matching to a particular LED or batch of LED's, while at the same time providing good response over varying LED-to-sensor distances.

In addition, many prior art mice involve the use of a mask in combination with an encoder wheel to properly distinguish rotation of the encoder wheel. Because such masks and encoder wheels are typically constructed of injection molded plastic, tolerances cannot be controlled to the precision of most semiconductor devices. This has led, effectively, to a mechanical upper limit imposed on the accuracy of the conventional optomechanical mouse, despite the fact that the forward path of software using such mice calls for the availability of ever-increasing resolution. There has therefore been a need for a cursor control device for which accuracy is not limited by the historical tolerances of injection molding.

In addition, in some instances it is desirable to offer cursor control devices with different resolutions. Thus, for example, in some applications a cursor control device having a resolution of 200 dots per inch is appropriate, while in other applications a cursor control device having a resolution of 400 dots per inch is desired. In such circumstances, different mechanical components are needed to implement such different resolutions, leading to increased complexity and expense. This increased expense is necessarily passed on to the consumer, creating more expensive products. There has therefore been a need for an optomechanical implementation for a cursor control device which can operate at different resolutions, when combined with appropriate other components.

SUMMARY OF THE INVENTION

The present invention substantially overcomes the foregoing limitations of the prior art by providing an optical sensor employing a differential sensing arrangement. Such an approach, as described in greater detail hereinafter, substantially eliminates the need to match LEDs and the associated photosensors.

Further, by appropriately locating multiple sensors on a single substrate, and providing associated microprocessor control, it is possible to eliminate the need for a mechanical mask. Such elimination of the mechanical mask permits increased resolution by removing the constraints on accuracy associated with injection molding of plastics as compared to fabrication of semiconductors.

In addition, the sensor may comprise multiple sensors on a single wafer of silicon, permitting use at different resolutions simply by altering a single mechanical component and reselecting the sensors being monitored.

The present invention is also less sensitive to LED-to-sensor distances than the prior art.

The pointing device of the present invention, which is operable with electronic mice, trackballs, or other pointing devices which convert rotational movement to digital signals, includes at least one and typically two shaft encoders positioned to be rotated by movement of a rotational member, such as a ball. The shaft encoder includes a mask or encoding wheel having slits therethrough conforming to the resolution of the pointing device in dots per inch. Typical resolutions vary between two hundred and four hundred dots per inch, although substantially higher resolutions are not uncommon.

Positioned on either side of the encoding wheel for each shaft encoder are two pairs of LED's and photosensors. The pairs are arranged not to be along a diameter of the wheel.

A differential sampling circuit detects motion of the wheel past the LED's, which causes the generation of a quadrature signal. The quadrature signal is then provided to a microprocessor, where the signal is sampled and manipulated as described in U.S. patent application Ser. No. 07/717, 187, now U.S. Pat. No. 5,256,913 , entitled Low Power Optoelectronic Device and Method and assigned to the assignee of the present invention. A conventional cursor control signal is then provided as the output of the microprocessor, although appropriate line drivers and related circuitry may be interposed. In particular, LED pulsing may be used to save power, among other techniques described in the aforementioned application.

In particular, the differential sensor of the present invention may be implemented as a single chip on which a plurality of photodetectors, such as photodiodes or phototransistors, may be disposed. In a typical arrangement, two pairs of photosensors spaced precise distances from one another are laid out on the semiconductor, although in a presently preferred embodiment, six sensors are fabricated into the semiconductor, with two of the sensors used only for low resolution, two used for both low and high resolution, and two used only for high resolution. In this manner the same sensor may be used for, for example, 200 dpi and 400 dpi resolution. In either event, two pairs of sensors are used at once.

The semiconductor bearing the photodetectors is positioned within the cursor control device so that the photodetectors are spaced apart from a pair of light source such as LEDs, with an encoding wheel placed therebetween. Depending on the desired resolution of the pointing device, the encoding wheel will have greater or fewer slots therethrough by which the light (usually but not necessarily infrared) is allowed to strike the photodetectors to indicate movement. Greater numbers of slots typically translates into increased resolution; the radial arrangement of slots about the center of the encoding wheel is precisely managed to ensure that light from the LEDs strikes the sensors only at the appropriate times; more particularly, a period of light striking one pair of detectors corresponds to a period of darkness at the adjacent photodetector. By this technique, the photodetectors permit current flow when the encoding wheel properly lines up, but are effectively open circuits when not struck by light. Accordingly, the output of the LEDs is a series of poorly shaped current pulses of different phase.

To provide improved detection, a comparator circuit comprising a plurality of current comparators receives on its A and B inputs the pulse train from a respective pair of photodetectors. In the presently preferred embodiment, the current comparators are fabricated on the same chip as the photodetectors, although such an arrangement is not in all cases required. In the presently preferred embodiment, four comparators are used, with the A and B inputs provided to each comparator being from selected ones of the six photodetectors. Each comparator then generates signal on a first output if A>B, and a signal on a second output if B>A. These outputs provide the inputs to an associated four RS latches, and in turn the output of the latches may be provided to a microprocessor for sampling and manipulation as required to provide an accurate representation of movement of the pointing device. In a presently preferred embodiment, the RS latches are also fabricated on the same substrate as the photodetectors and comparators.

It is therefore one object of the present invention to provide a cursor control device having optomechanical sensors which do not require matching of LEDs and photodetectors.

It is another object of the invention to provide a cursor control device using a ball having differential sensors for detecting rotational movement of the ball.

It is a further object of the present invention to provide a monolithic photosensor having a plurality of photodetectors disposed thereon for providing different resolutions of optical sensing.

It is yet another object of the present invention to provide a cursor control device which requires only an encoding wheel, a light source and a photodetector for detecting the rotation of a ball indicative of movement of the cursor control device.

These and other objects of the present invention will be better appreciated from the following Detailed Description of the Invention, taken in combination with the appended Figures.

FIGURES

DETAILED DESCRIPTION OF THE INVENTION

Figure 1:
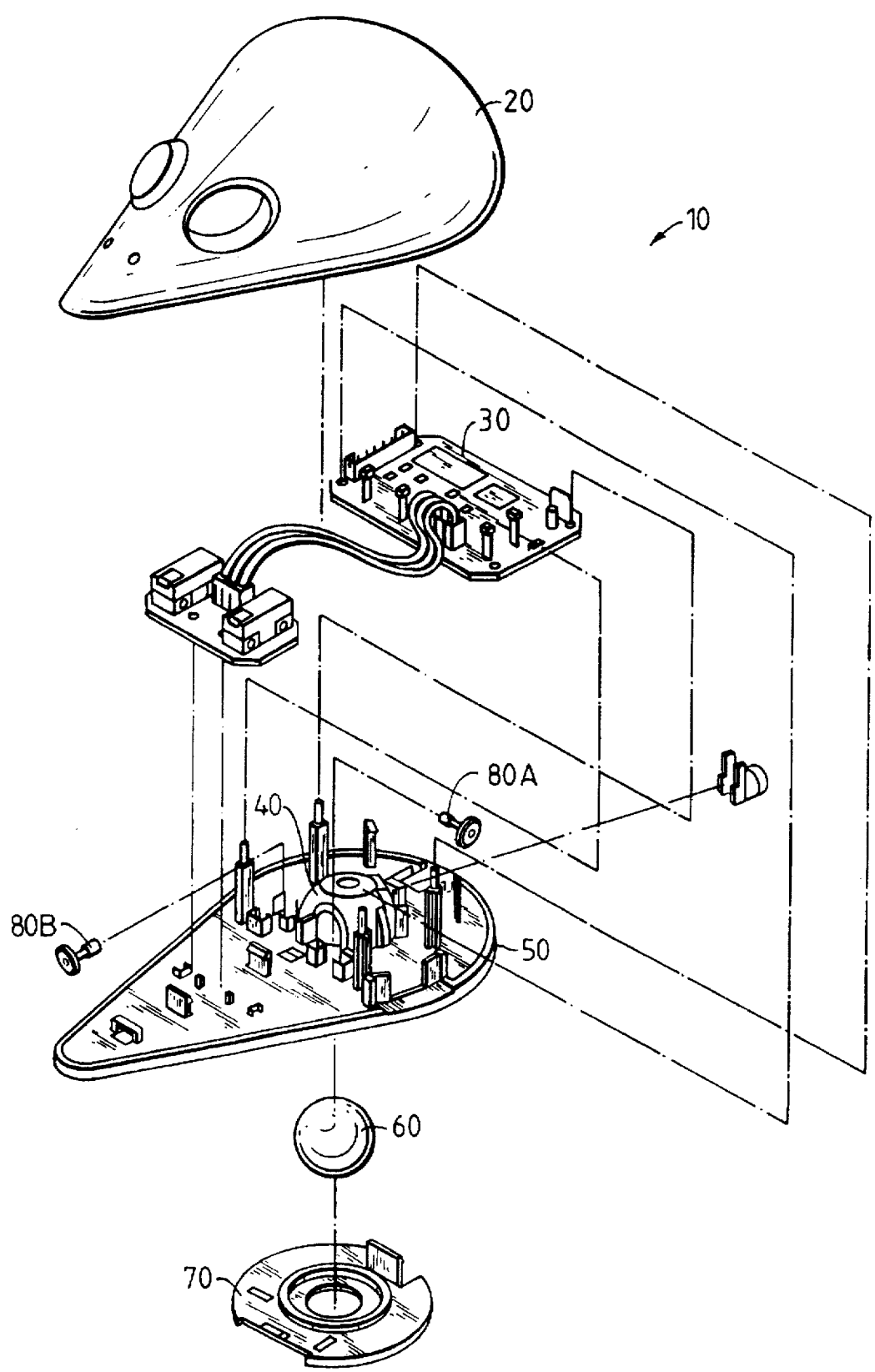
FIG. 1 shows in exploded perspective view a pointing device, and in particular a mouse, according to the present invention.

Referring first to FIG. 1, an electronic pointing device, and in particular an electronic mouse 10, is shown in exploded perspective view. The mouse 10 includes an upper housing 20, a printed circuit board 30 close to which a ball cage 40 is juxtaposed, a lower housing 50 (onto which the ball cage is sometimes mounted), a ball 60, and a belly door 70 which connects into the lower housing for retaining the ball within the ball cage 40.

The printed circuit board 30 typically includes circuitry for converting the analog movement of the ball 60 into digital signals, and in particular typically includes a pair of shaft encoders 80A–B which are maintained in engagement with the ball 60. The shaft encoders 80A–B each include an encoder wheel 90A–B of the type described in U.S. patent application Ser. No. 07/768,813, entitled Integral Ball Cage for Pointing Device and commonly assigned with the present invention, and incorporated herein by reference. Thus, movement of the mouse causes rotational movement of the ball, and that rotational movement is in turn converted into digital signals which control the cursor on the screen of an associated personal computer, terminal or workstation. In serial port mice, the printed circuit board will typically include a microprocessor and related driver circuitry for sending and receiving standard serial communications, such as RS232 signals. Alternatively, if the mouse is a bus device, the intelligence will typically be found on a circuit board installed within the PC, and the circuit board in the mouse will simply comprise photodetectors and associated signal shaping circuitry, together with line drivers for transmitting the signal to the board in the PC.

Figure 2:
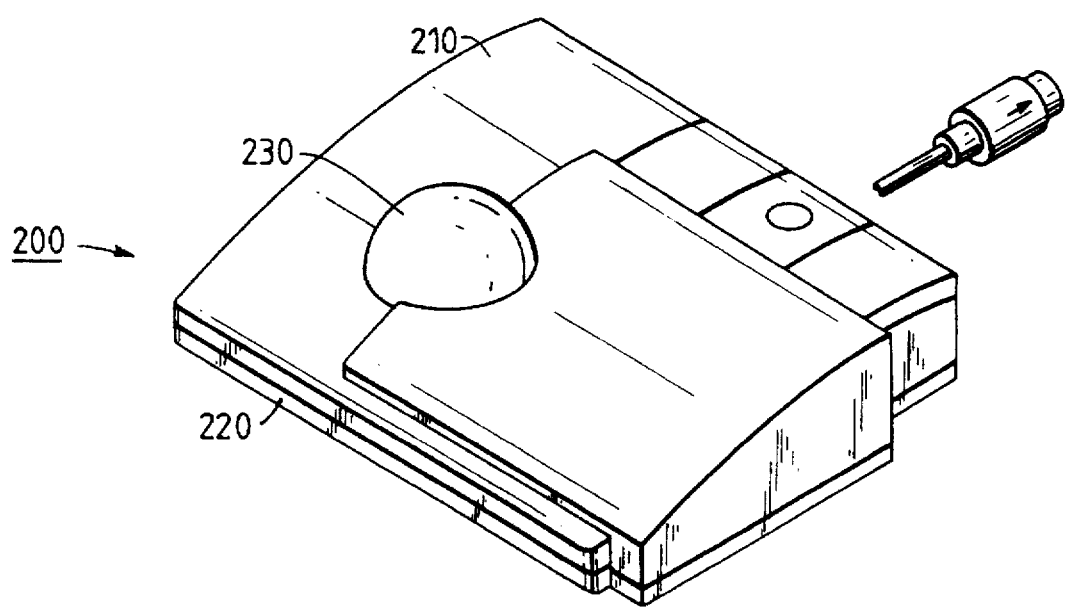
FIG. 2 shows in perspective view a cursor control device, and in particular a trackball, in accordance with the present invention.

Referring next to FIG. 2, a trackball 200 is shown in perspective view. While trackballs are typically similar to electronic mice in terms of the optomechanical aspects, the physical aspects of supporting the ball can be and usually are quite different. Thus, the trackball 200 includes an upper housing 210 and a lower housing 220, between which is sandwiched a ball 230. Also enclosed within the upper and lower housings are ball supporting elements such as described in U.S. Pat. No. 5,008,528, entitled Invertible Trackball, which convert rotational movement of the ball into cursor control signals just as with the mouse of FIG. 1.

Figure 3:
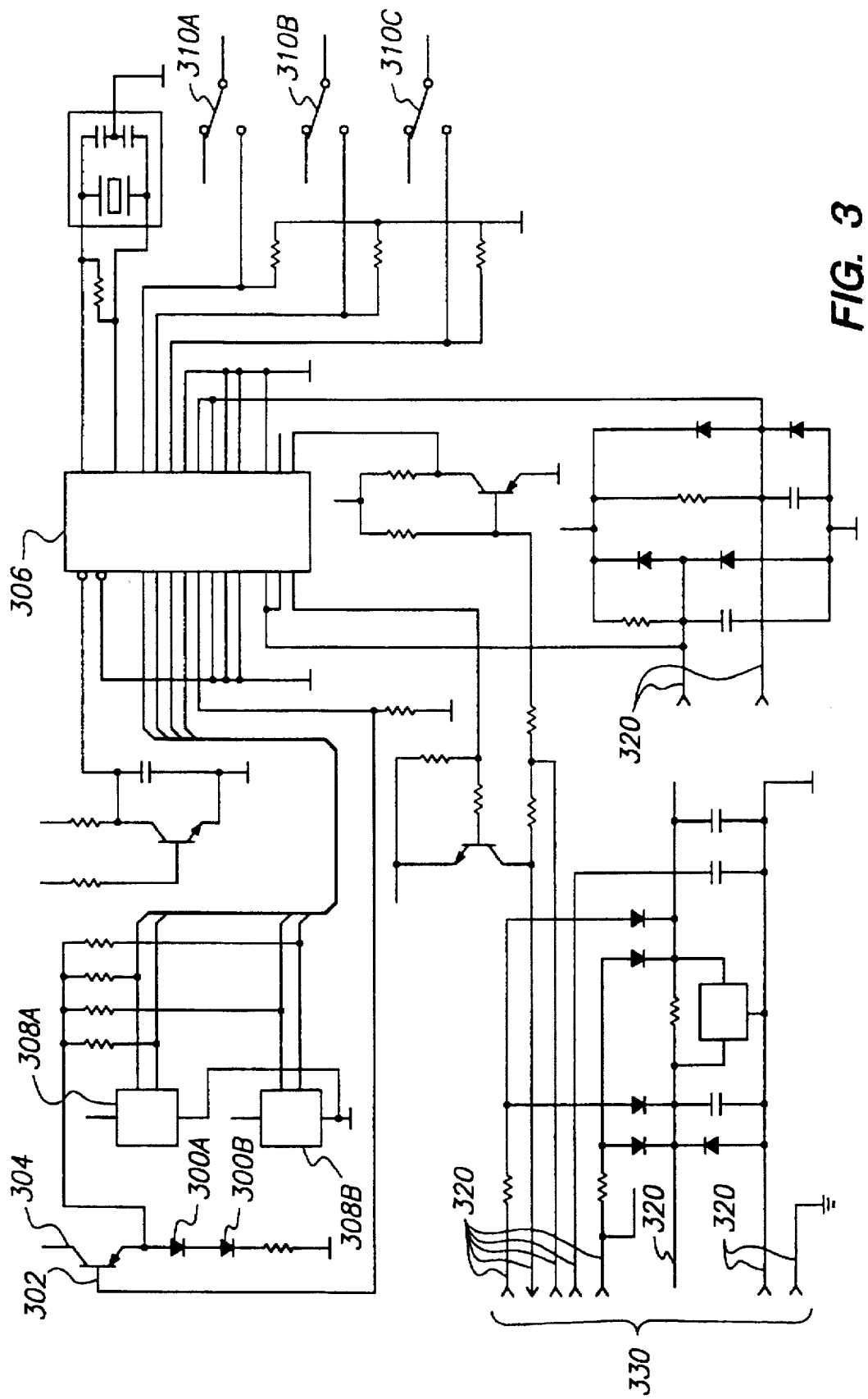
FIG. 3 shows in schematic diagram form the electronics associated with the cursor control or pointing devices of FIGS. 1 and 2.

Referring next to FIG. 3, the circuitry included on the printed circuit board 30 of FIG. 1 may be better appreciated. In particular, a pair of LED's 300A–300B generate photons in accordance with a control signal applied along a line 302 to the base of a current amplifier transistor 304, the collector of which is connected to $V_{cc}$. The control line 302 is controlled by a processor 306, which typically pulses the LEDs 300A–B to save power although such pulsing is not required. One method for pulsing such LEDs is described in U.S. patent application Ser. No. 07/717,187, now U.S. Pat. No. 5,256,913, referenced earlier, and which is incorporated herein by reference.

In appropriate circumstances, light from the LEDs 300A–B strikes photodetector circuits 308A–B. As will be discussed in connection with FIG. 4, each of the photodetector circuits 308A–B in fact comprises an array of photodetectors and related circuitry, including associated comparators and latches. It will be appreciated by those skilled in the art that, although not shown in FIG. 3, the encoder wheels 90A–B shown in FIG. 1 are in fact interposed between the LEDs 300 and the photodetector circuits 308, and light from the LEDs reach the photodetectors only when the slots in the encoder wheels provide a path from the LED to the photodetector.

The output of the photodetector circuits 308A–B is provided to the processor 306, where it can be sampled and manipulated in the manner taught by the aforementioned U.S. patent application Ser. No. 07/717,187, now U.S. Pat. No. 5,256,913.

In addition, control signals may be provided to the processor by means of user operated switches 310A–C. Finally, for the embodiment shown in FIG. 3, the processor receives and outputs conventional RS-232 signals through a plurality of lines 320 which comprise a serial port 330.

Figure 4:
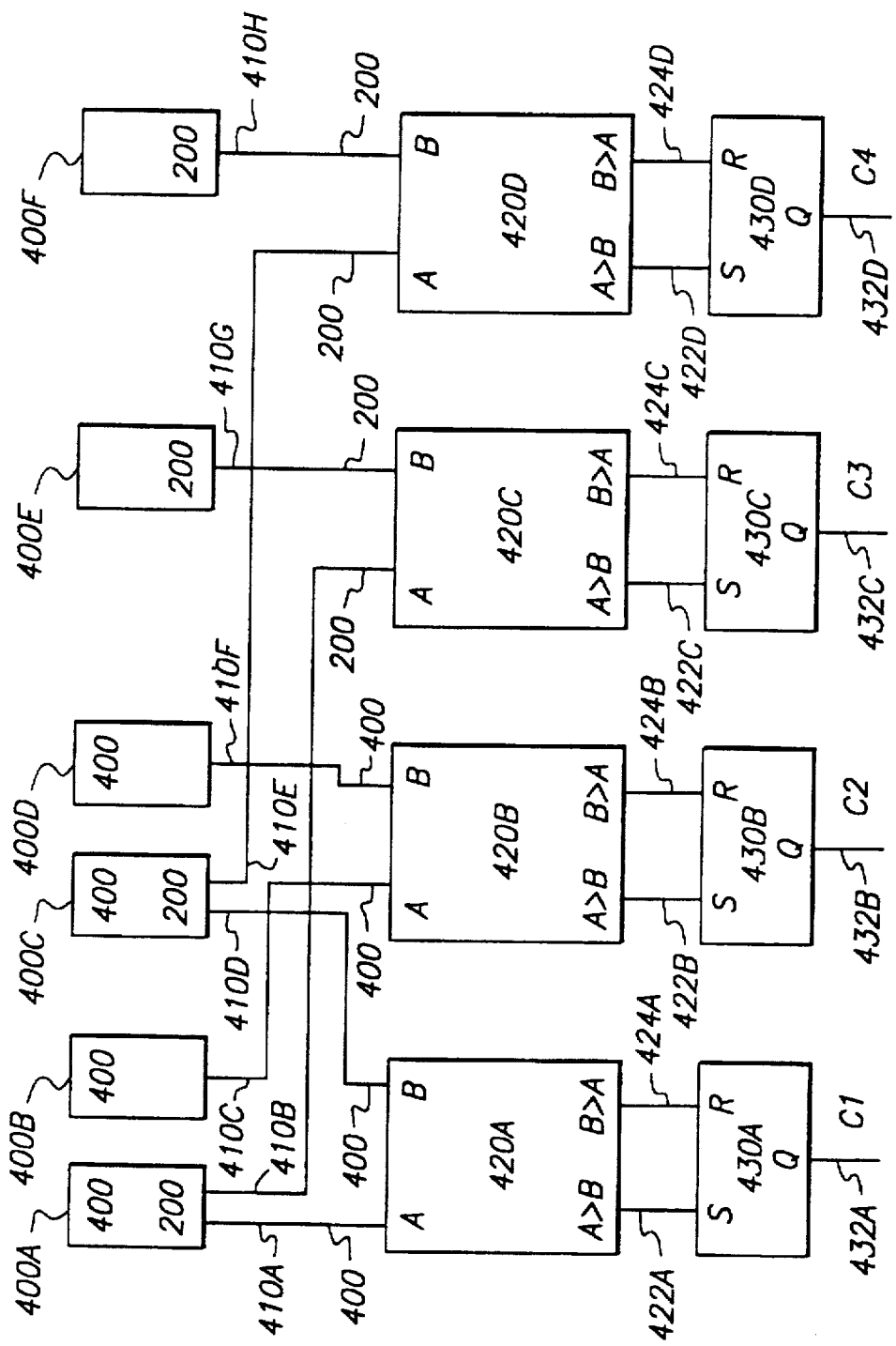
FIG. 4 shows in block diagram form a photodetector, comparator circuit and latch in accordance with the present invention.

Turning next to FIG. 4, the photodetector circuits 308 are shown in schematic block diagram form. In particular, each circuit 308 includes an array of photodetectors 400, and in the presently preferred embodiment comprises six such photodetectors 400A–F. In some instances it is not necessary to provide such a plurality of sensors; however, this arrangement has the advantage of permitting different resolutions depending on the type of encoding wheel 90 used and which photodetectors 400A–F are selected for monitoring.

In the exemplary embodiment show in FIG. 4, for example, photodetectors 400A and 400C may be used for both 200 dpi and 400 dpi resolution, while photodetectors 400B and 400D are used only for 400 dpi resolution and photodetectors 400E and 400F are used only for 200 dpi resolution. Regardless which resolution is chosen, the operation of the photodetectors is to generate a pulse train on output lines 410A–H in response to light received from the LEDs 300 through the encoder wheels 90.

It should be noted that the photodetectors 400 can be either a photodiode or a phototransistor. In a presently preferred embodiment, a photodiode is used because of its faster response times. However, phototransistors, and particularly Darlington pairs, are also acceptable in many instances.

The output(s) of each photodetector 400A–F is paired with output of another photodetector of the same resolution, and each pair of output 410 provides the inputs to one of an array of current comparators 420A–D. Thus, for example, outputs 410A and 410D provide the paired inputs to comparator 420A, while outputs 410C and 410F provide the paired inputs to comparator 420B. For purposes of example, these pairings may be considered to represent the higher resolution. Thus, pairs 410B/410G and 410E/410H and their associated comparators 420C and 420D may be considered to represent the lower resolution. It will be apparent to those skilled in the art that numerous additional resolutions could be provided simply by providing additional photodetectors 400 and associated circuitry.

The current comparators 420A–D each compare their respective A and B inputs, and provide a comparator output signal on a first output 422A–D if the A input signal is greater than the B input signal. Similarly, a comparator output signal is provided on a second output 424A–D if the B input signal is greater than the A input signal.

The output signals 422A–D each provide a set input to an associated one of four RS latches 430A–D, while the output signals 424A–D each provide a Reset input to the associated RS latch 430A–D. For each resolution, two latches are operable, such that two of the outputs of the latches 430A–D are provided to the processor 306 (FIG. 3) from each photodetector circuit 308, as shown in FIG. 3.

Figure 5A:
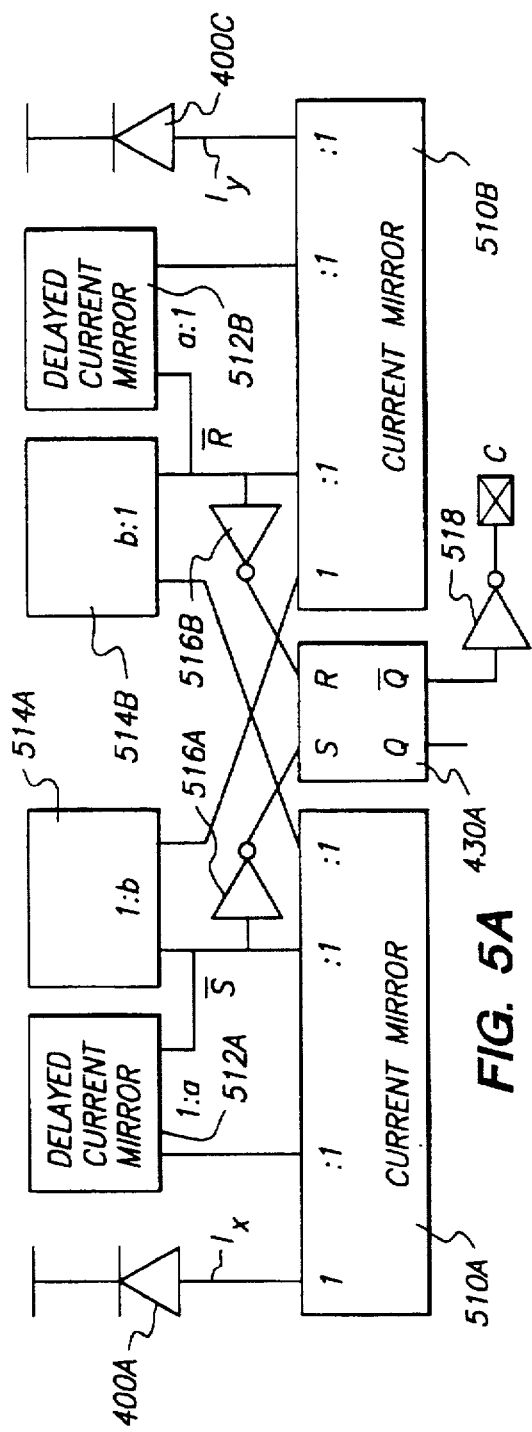
FIG. 5A shows in greater detail in block diagram form the current comparator and latch circuit of the present invention.
Figure 5B:
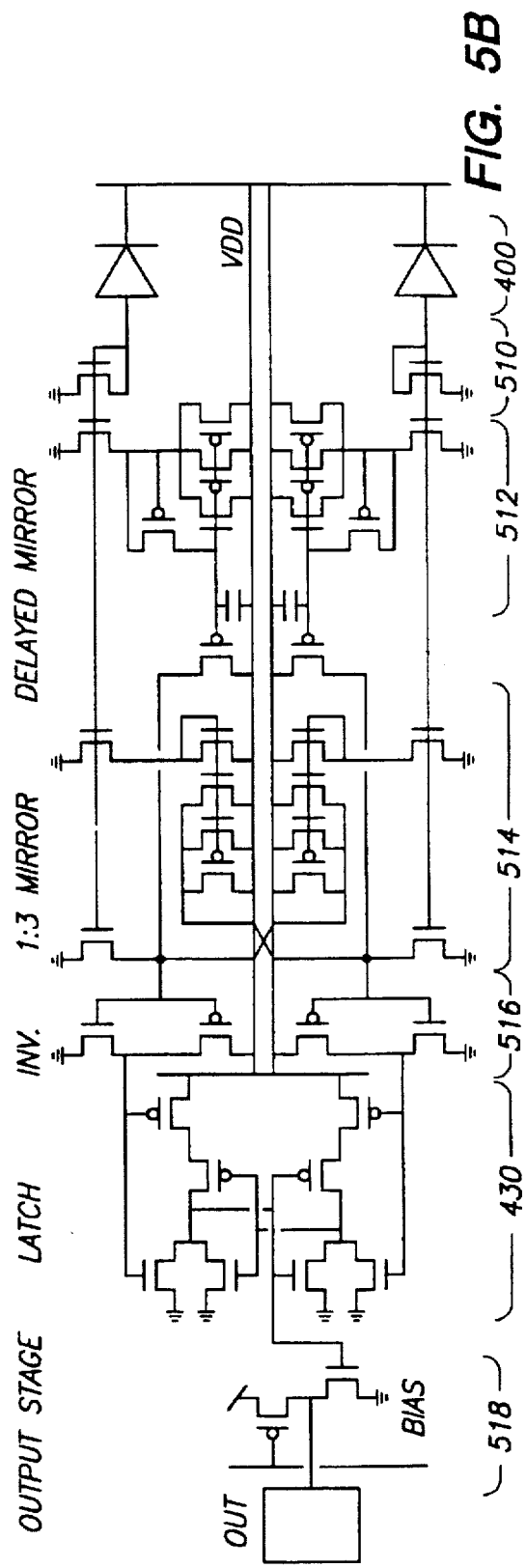
FIG. 5B shows at component level the circuitry shown in FIG. 5A.

Taking FIGS. 5A and 5B in combination with FIG. 4, the operation of one channel (i.e., one comparator 420 and one associated latch 430) can be better appreciated. For purposes of illustration, the photodetectors 400A and 400C, comparator 420A and latch 430A have been arbitrarily selected. Referring first to FIG. 5A and concurrently to the more detailed diagram of FIG. 5B, the photodiodes 400A and 400C generate a current $I_x$ and $I_y$ respectively, in response to impinging light from the LEDs 300.

The currents $I_x$ and $I_y$ are each mirrored in respective current mirror circuits 510A and 510B, in a circuit which is symmetrical for each input. In addition, delayed current mirror circuits 512A–B, respectively, are provided. The result is that the currents $I_x$ and $I_y$ are mirrored with a ratio of b>1 and a<1. The output S' of the delayed current mirror 512A is the result of the comparison of $I_x$ with $bI_y+aI_x$; similarly, the output R' of the delayed current mirror 512B is the result of the comparison of $I_y$ with $bI_x+aI_y$; the b mirror factor is provided by a pair of circuits 514A–B cross-connected to $I_y$ and $I_x$, respectively. It can thus be appreciated that the output S' is driven to ground when the current in the diode 400A is b/(1-a) bigger than in the diode 400C, while the output R' is driven to ground when the current in the diode 400C is b/(1-a) bigger than in the diode 400A. The outputs are typically inverted in inverters 516A–B before feeding the RS latch 430A.

To ensure proper operation of the RS latch, some precautions are appropriate. More particularly, maintaining a ratio b>1 ensures that for the same current $I_x=I_y$, the signals S' and R' are high; that is, S'=R'=1. Additionally, a ratio a<1 in the delayed mirror circuits ensures that the outputs return to 1 after the LED is turned off and before the next flash occurs. The time constant associated with the output nodes S' and R' is proportional to the capacitance at the nodes and inversely proportional to the current charging or discharging the capacitance—that is, the time constant depends on the how much light illuminates the photodetectors. When the LED is turned off, only dark currents are available through the photodiodes. To maintain a high current in this branch, so that the capacitance can be charged in a time t, $I_x$ and $I_y$ are stored in the delayed mirror circuits 512A–B. This ensures that the outputs return to 1 with a time constant much smaller than the pulsing frequency of the LEDs. The output waveform of the delayed current mirror can be better appreciated from FIG. 5C.

Figure 5C:
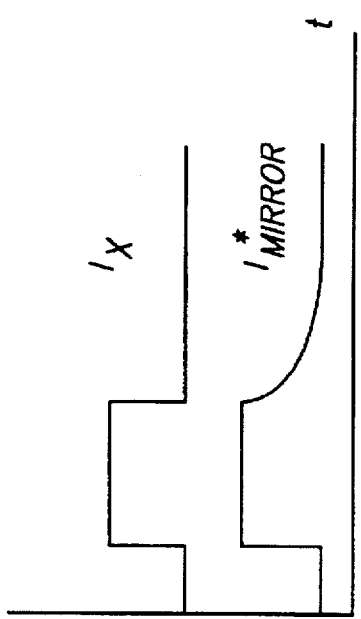
FIG. 5C shows the output waveform of the delayed current mirror of FIGS. 5A–5B.
Figure 5D:
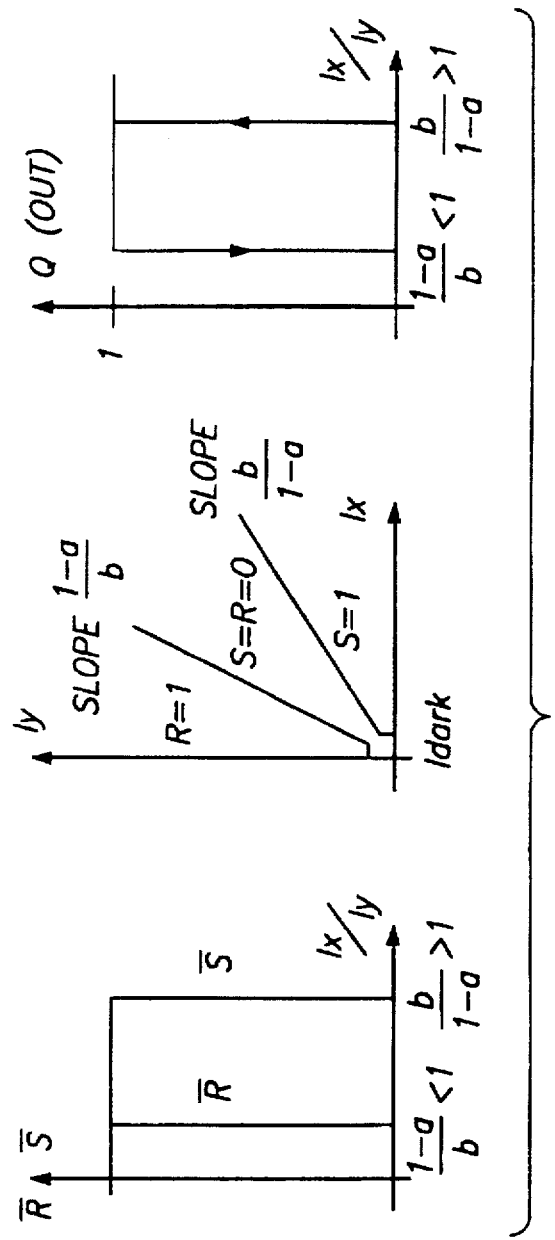
FIG. 5D shows the hysteresis generated by the circuit of FIGS. 5A–5B.

In addition, the implementation shown in FIGS. 5A–5B using the current comparator and RS latches introduces an hysteresis function, with the hysteresis thresholds determined by the values of a and b. Referring to FIG. 5D, the hysteresis of the comparator can be better appreciated. The first plot of FIG. 5C shows the outputs of the current comparators as a function of the current ratio, whereas the second plot shows the outputs of the current comparators as a function of the values of the diode currents. Finally, the third plot of FIG. 5C shows the output of the RS latch as a function of the current ratio.

To ensure sufficient hysteresis to avoid noise and component mismatch problems, yet small enough for the available semiconductor area and current consumption, values of b=3 and a=⅓ have been implemented successfully. This yields a ratio of b/(1-a)=4.5. The ratios can be implemented by designing three parallel transistors in one branch of the mirror, and only one transistor in the other branch, as best seen from FIG. 5B. It will be appreciated by those skilled in the art that the entire detector 308 comprises a plurality of the circuits shown in FIG. 5A-5B; in particular, the presently preferred embodiment comprises four such circuits which effectively operate independently.

Figure 6:
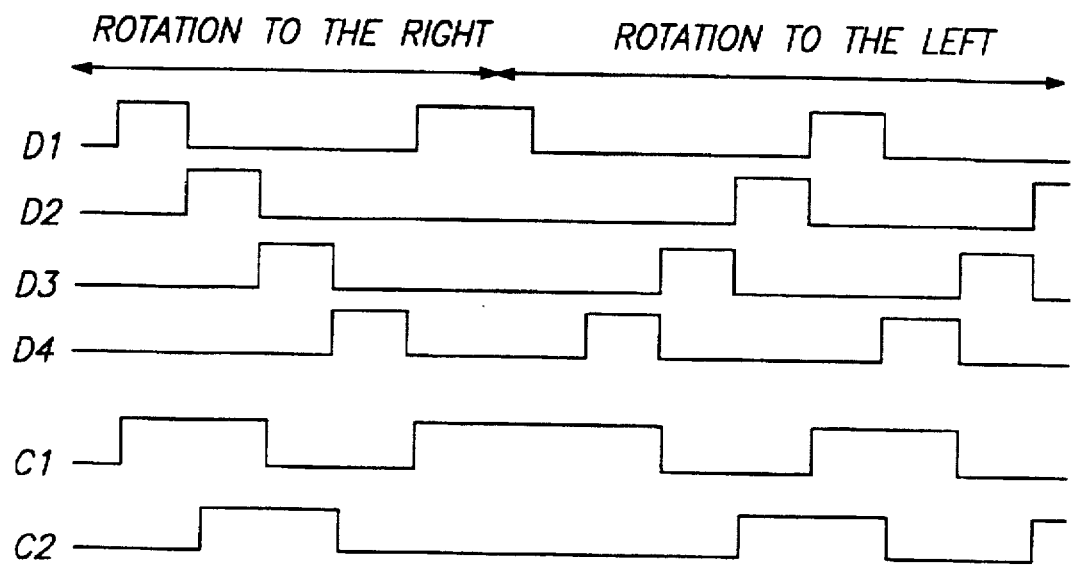
FIG. 6 shows a series of waveforms as generated by the photodetectors of the present invention in response to rotation of the ball of the cursor control device.

Referring next to FIG. 6, the waveforms at the outputs of the photodetectors 400 and the comparators 420 can be better appreciated. More particularly, the appearance of the waveforms with movement of the ball to the left or right can be understood. In particular, given that four photodetectors are operable for either resolution, four photodetector outputs are shown as D1, D2, D3 and D4, with rotation to the left and to the right as shown at the top of the figure. In turn, the final output of the associated comparators 420 are designated C1 and C2.

From the foregoing, it can be appreciated that the current invention provides a simplified optomechanical encoder for use with cursor pointing devices in that it eliminates the need for a mask while at the same time making it possible to have high resolution.

In addition, the differential sensing of the present encoder substantially eliminates the need to match LEDs and photodetectors, thus substantially simplifying automated assembly.

In addition, the use of an array of photodetectors in a single sensor, with specific sensors monitored based on desired resolution, provides simplified assembly more conducive to automation.

Figure 7:
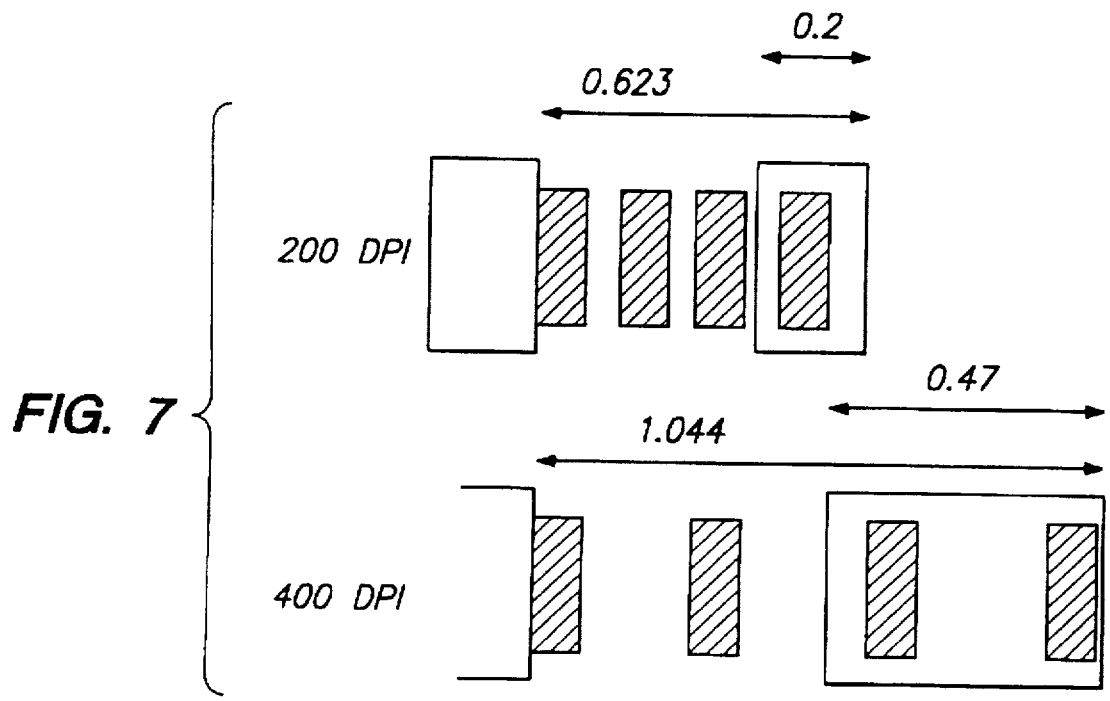
FIG. 7 shows the layout of photodetectors on a monolithic semiconductor for use at different resolutions.

To better appreciate the spatial relationships, reference is made to FIG. 7, in which the upper diagram shows the spatial relationship between disk slots 700 and photodiodes 400 in a 200 dpi implementation, where the values of $d_{space}$ and $d_{slot}$ are on the order of 0.623 mm and 0.2 mm, respectively. In the lower diagram of FIG. 7 is show the corresponding spatial relationship between disk slots 710 and photodiodes 400 for a 400 dpi implementation, where the distances $d_{space}$ and $d_{slot}$ are on the order of 1.044 mm and 0.47 mm.

Having fully described a preferred embodiment of the present invention together with alternatives, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. A cursor control device for control the position of a cursor on a video display screen wherein the cursor control device uses a rotatable ball in engagement with at least two shaft encoders to convert rotational movement of the ball into digital signals representing movement of the cursor comprising a housing, means for supporting the ball in engagement with the at least two shaft encoders, each of said shaft encoders having thereon an encoder wheel having slots therein, and the at least two shaft encoders arranged orthogonally to permit one shaft encoder to detect movement in an X direction and another to detect movement in the Y direction, light emitting means on one side of each encoding wheel for emitting light in the direction of said encoding wheel, a plurality of light sensitive means on the other side of each encoding wheel for detecting when the slots in the encoding wheel permit light from the light emitting means to impinge upon at least one of the light sensitive means and for generating at least one sensor output signal having a magnitude in response thereto, with no mask interposed between the light emitting means and the light sensitive means, and a plurality of comparator means responsive to a plurality of said at least one sensor output signals for comparing at least first and second of said sensor output signals and generating at least one comparator output signal representative of the relative magnitudes of said sensor output signals, each comparator means providing a comparator output signal on a first output port if the first sensor output signal is greater than the second sensor output signal, and providing a signal on a second output port if the second sensor output signal is greater than the first sensor output signal, processor means responsive to the comparator output signal for providing a cursor control output representative of the movement of the ball in one dimension for each of said shaft encoders.

2. The invention of claim 1 wherein each of the plurality of comparator means and light sensitive means operatively associated with a shaft encoder are fabricated within a single integrated circuit.

* * * * *